United States Patent [19]

Imai

[11] Patent Number: 4,721,371

[45] Date of Patent: Jan. 26, 1988

[54] VARIABLE FOCAL LENGTH LENS SYSTEM
[75] Inventor: Toshihiro Imai, Tokyo, Japan
[73] Assignee: Olympus Optical Co., Ltd., Tokyo, Japan
[21] Appl. No.: 919,642
[22] Filed: Oct. 16, 1986
[30] Foreign Application Priority Data Oct. 18, 1985 [JP] Japan ............................... 60-232902

[51] Int. Cl.⁴ .............................................. G02B 15/16
[52] U.S. Cl. ..................................... 350/427; 350/432
[58] Field of Search ................ 350/423, 427, 428, 432

[56] References Cited

FOREIGN PATENT DOCUMENTS 58-215620 12/1983 Japan .
60-48009 3/1985 Japan .

Primary Examiner—John K. Corbin
Assistant Examiner—Ronald M. Kachmarik
Attorney, Agent, or Firm—Cushman, Darby & Cushman

[57] ABSTRACT

A variable focal length lens system comprising a first lens unit having positive refractive power, a second lens unit comprising a negative lens, and a third lens unit comprising a positive lens and arranged that the focal length of the lens system as a whole is varied from the short focal length to the long focal length by moving the first and second lens units toward the object side along the optical axis, the variable focal length lens system being arranged very compactly, i.e., arranged that the overall length of the lens system is very short and the outer diameter thereof is very small.

4 Claims, 6 Drawing Figures

SPHERICAL ABERRATION F/5.6

ASTIGMATISM 27.6°

DISTORTION fw = 41.4

SPHERICAL ABERRATION F/6.3

ASTIGMATISM 18.6°

DISTORTION $f_T$ = 64.3

VARIABLE FOCAL LENGTH LENS SYSTEM

BACKGROUND OF THE INVENTION (a) Field of the Invention

The present invention relates to a variable focal length lens system and, more particularly, to a variable focal length lens system suitable for the use with compact cameras such as lens shutter cameras.

(b) Description of the Prior Art

Compact cameras such as lens shutter cameras are widely used because they are handy and very convenient for carrying. In recent years, compact cameras have made a remarkable advance in various points, i.e., enriched additional functions such as built-in stroboscopic lamp, automatic focus adjustment, automatic film loading, etc., and automatization of various operations, and have become more and more convenient to use. To make the range of use of compact cameras still wider, those provided with variable focal length lens system as photographing lens systems have appeared in addition to conventional compact cameras provided with lens systems with fixed focal length.

Lens systems disclosed, for example, in Japanse published unexamined patent applications Nos. 215620/83 and 48009/85 are known as the above-mentioned kind of variable focal length lens systems. The known lens system disclosed in Japanese published unexamined patent application No. 215620/83 comprises a first lens unit comprising four lenses and having positive refractive power, a second lens unit comprising two lenses and a third lens unit comprising a positive single lens and is arranged to vary the focal length of the lens system as a whole by keeping the third lens unit fixed in relation to the image surface and moving the first and second lens units along the optical axis. The focal length varying ratio of said known lens system is large, i.e., about 2 times. However, said known lens system comprises a large number of lenses. Besides, as the second lens unit to be moved has a large diameter, a wide space is needed at the time of moving. Therefore, it is difficult to make the lens system as a whole compact, and the camera tends to become large.

On the other hand, the variable focal length lens system disclosed in Japanese published unexamined patent application No. 48009/85 comprises a first lens unit comprising three lenses and having positive refractive power and a second lens unit comprising a negative single lens and is arranged to move said two lens units along the optical axis. Therefore, the number of lenses constituting the lens system is comparatively small.

However, also in case of said known lens system, the second lens unit to be moved has a very large diameter and needs a large space for the purpose of moving. Consequently, it is unaovidable to reserve a large space for the lens system in the inside of the camera and, therefore, it is also difficult to make the camera compact.

SUMMARY OF THE INVENTION

It is, therefore, a primary object of the present invention to provide a variable focal length lens system which is arranged very compactly, i.e., arranged that the overall length of the lens system is very short and the outer diameter thereof is very small.

To solve the afore-mentioned problems, the variable focal length lens system according to the present invention is arranged to comprise a first lens unit I comprising three lenses and having positive refractive power, a second lens unit II comprising a positive lens and a third lens unit III comprising a negative lens and to vary the focal length of the lens system as a whole from the short focal length to the long focal length by moving said first lens unit and said second lens unit toward the object side along the optical axis, said variable focal length lens system being arranged to fulfill the following conditions:

$$0.2 < l_{2W}/f_W < 0.28 \tag{1}$$

$$0.9 < |f_2|/f_W < 1.2 \tag{2}$$

where, reference symbol $l_{2W}$ represents the airspace between the second and third lens units in the position of the short focal length, reference symbol $f_2$ represents the focal length of the second lens unit, and reference symbol $f_W$ represents the focal length of the lens system as a whole in the position of the short focal length.

In a lens system of the type like the lens system according to the present invention, the height of offaxial ray becomes higher toward the image surface. Therefore, to make the diameters of the lens units to be moved small, it is effective when the distance of the second lens unit is made as long as possible from the image surface. In other words, it is effective to make the airspace between the second and third lens units somewhat large. However, when it is only arranged to make the distance of the second lens unit from the image surface long, the overall length of the lens system becomes very long in the position of the long focal length. To solve the above-mentioned problem, it is effective to arrange that the amount of movement of the second lens unit, which moves largely when the focal length of the lens system as a whole is varied from the short focal length to the long focal length (when the first and second lens units are moved toward the object side along the optical axis), becomes as small as possible by making the focal length of the second lens unit short.

The variable focal length lens system according to the present invention is arragned to fulfill the conditions (1) and (2) shown before and is thereby arranged to make it possible to attain the object of the present invention to provide a variable focal length lens system arranged very compactly by making the overall length thereof very short and outer diameter thereof very small.

The condition (1) defines the airspace between the second and third lens units in the position of the short focal length. If $l_{2W}/f_W$ is made smaller than the lower limit of the condition (1), the second lens unit comes too much toward the image surface and the outer diameter of the second lens unit becomes large. Therefore, it is impossible to attain the object of the present invention to make the lens system as a whole compact. On the other hand, when $l_{2W}/f_W$ is made larger than the upper limit of the condition (1), it is possible to make the outer diameter of the second lens unit small. However, the second lens unit comes too far from the image surface in the position of the short focal length. As a result, the overall length of the lens system becomes long in the position of the long focal length and it is also impossible to make the lens system as a whole compact.

The condition (2) defines the focal length of the second lens unit in the position of the short focal length. If $|f_2|/f_W$ is made larger than the upper limit of the condition (2), the amount of movement of the second lens unit to be moved for the purpose of varying the focal length becomes too large and the overall length of the lens system becomes long in the position of the long focal length. Therefore, it is impossible to make the lens system as a whole compact. On the other hand, if $|f_2|/f_W$ is made smaller than the lower limit of the condition (2), the refractive power of the second lens unit becomes too strong. As a result, it becomes difficult to correct aberrations even when the lens configurations of the other lens are modified variously.

DETAILED DESCRIPTION OF THE PREFERRED EMBODIMENTS

Now, preferred embodiments of the variable focal length lens system according to the present invention described in detail so far are shown below.

Figure 1:
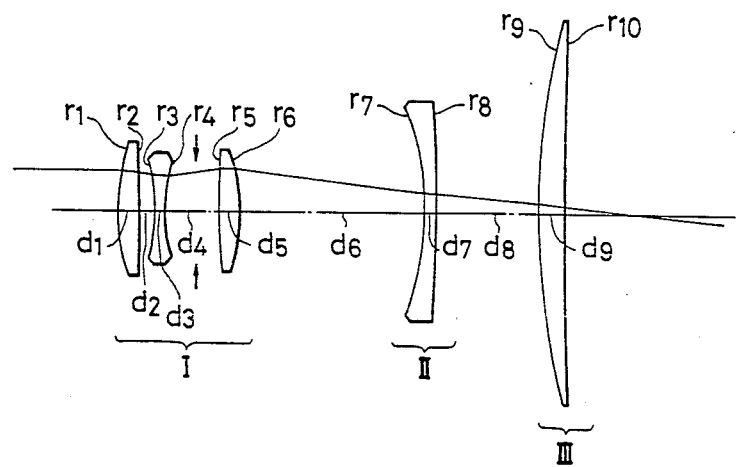
FIG. 1 shows a sectional view of a preferred embodiment of a variable focal length lens system according to the present invention in the position of the short focal length.
Figure 2:
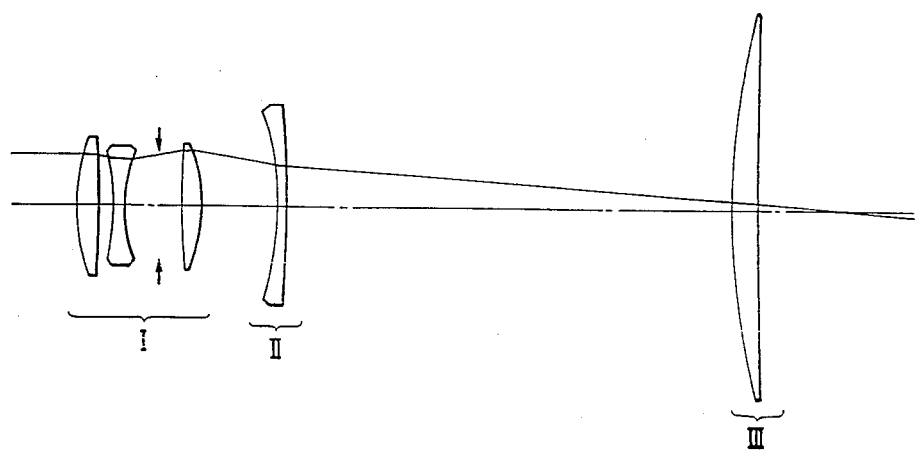
FIG. 2 shows a sectional view of said embodiment of the present invention in the position of the long focal length.
Figure 3:
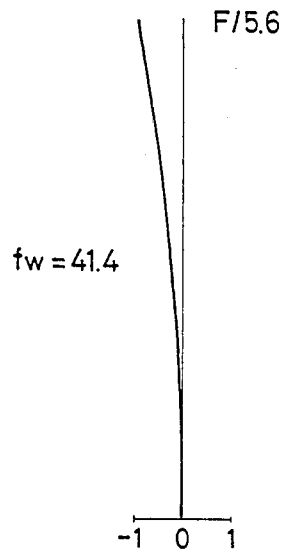
FIG. 3 shows graphs illustrating aberration curves of Embodiment 1 of the present invention in the position of the short focal length.
Figure 3:
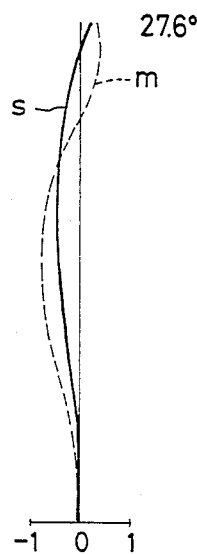
Figure 3:
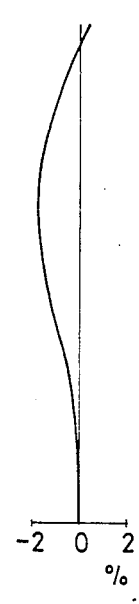
Figure 4:
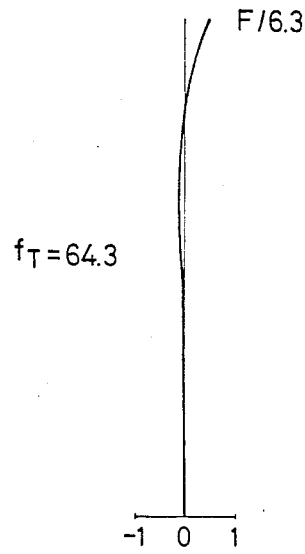
FIG. 4 shows graphs illustrating aberration curves of Embodiment 1 of the present invention in the position of the long focal length.
Figure 4:
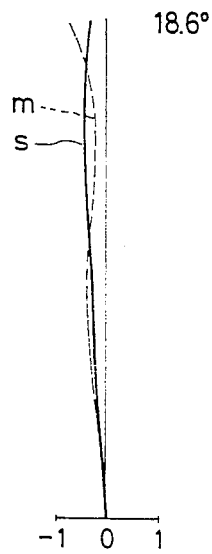
Figure 4:
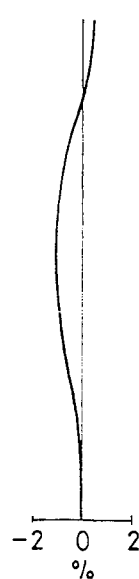
Figure 5:
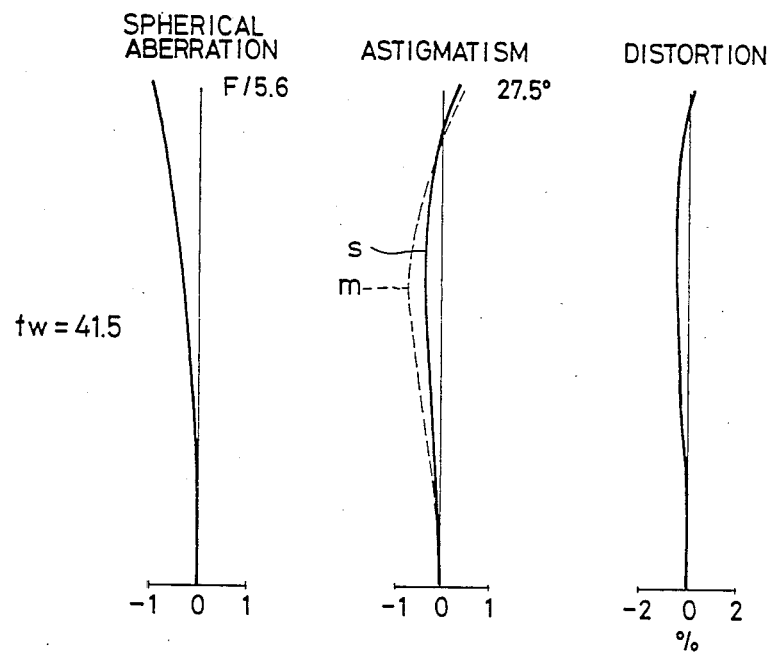
FIG. 5 shows graphs illustrating aberration curves of Embodiment 2 of the present invention in the position of the short focal length.
Figure 6:
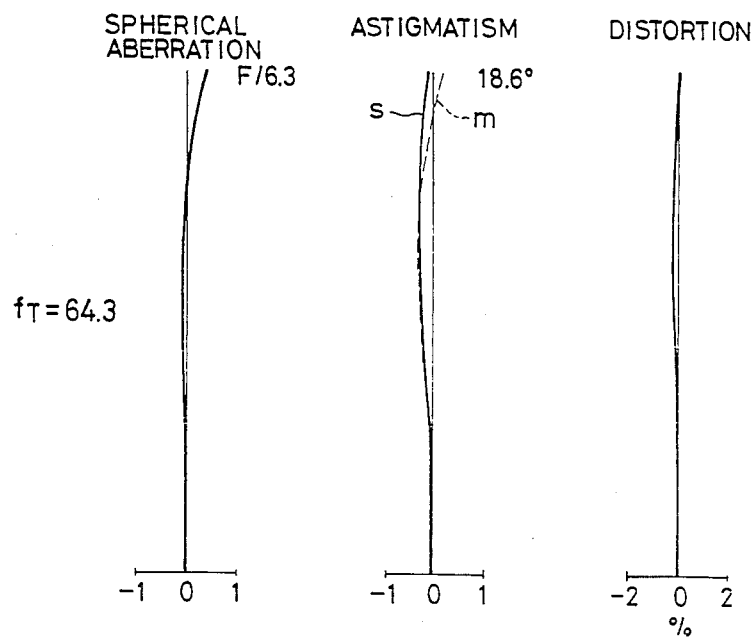
FIG. 6 shows graphs illustrating aberration curves of Embodiment 2 of the present invention in the position of the long focal length.

Each of said preferred embodiments has the lens configuration as shown in FIG. 1 (in the position of the short focal length) and FIG. 2 (in the position of the long focal length). As it is evident from said figures, each embodiment is arranged that the first lens unit I comprises a positive lens, a negative lens and a positive lens, the second lens unit II comprises a negative meniscus lens having a concave surface on the object side, the third lens unit III comprises a positive meniscus lens with weak refractive power having a convex surface on the object side, and a stop is arranged between said negative lens in the first lens unit I and said positive lens located on the image side in the first lens unit I.

Respective embodiments of the present invention have numerical data shown below.

Embodiment 1

$r_1 = 18.201$
$d_1 = 2.18$   $n_1 = 1.8044$   $\nu_1 = 39.58$
$r_2 = -197.048$
$d_2 = 1.34$
$r_3 = -22.066$
$d_3 = 1.00$   $n_2 = 1.74$   $\nu_2 = 28.29$
$r_4 = 13.982$
$d_4 = 5.43$
$r_5 = 50.582$
$d_5 = 2.2$   $n_3 = 1.66998$   $\nu_3 = 39.27$
$r_6 = -14.554$
$d_6 =$ (variable)
$r_7 = -27.378$
$d_7 = 1.00$   $n_4 = 1.78472$   $\nu_4 = 25.71$
$r_8 = -142.25$ (aspherical surface)
$d_8 =$ (variable)
$r_9 = 75.10$ (aspherical surface)
$d_9 = 2.3$   $n_5 = 1.49216$   $\nu_5 = 57.5$
$r_{10} = 418.467$
f   41.4 ($f_W$)   64.3 ($f_T$)
$d_6$   16.95 ($l_{2W}$)   9.97   $f_2 = -43.37$
$d_8$   7.13   42.26   $\phi_2 = 19.4$
$P_8 = 0.986$   $E_8 = 0.338 \times 10^{-5}$   $F_8 = 0.868 \times 10^{-7}$   $G_8 = -0.293 \times 10^{-9}$
$P_9 = 0.045$   $E_9 = 0.129 \times 10^{-4}$   $F_9 = -0.481 \times 10^{-7}$   $G_9 = 0.487 \times 10^{-10}$
$R = 1.167$   $l_{2W}/f_W = 0.24$   $|f_2|/f_W = 1.05$
F/5.6~6.3

Embodiment 2

$r_1 = 18.357$
$d_1 = 2.18$   $n_1 = 1.8044$   $\nu_1 = 39.58$
$r_2 = -192.648$
$d_2 = 1.34$
$r_3 = -22.0$
$d_3 = 1.0$   $n_2 = 1.74$   $\nu_2 = 28.29$
$r_4 = 14.039$
$d_4 = 5.43$
$r_5 = 50.121$
$d_5 = 2.2$   $n_3 = 1.66998$   $\nu_3 = 39.27$
$r_6 = -14.582$
$d_6 =$ (variable)
$r_7 = -28.13$
$d_7 = 1.0$   $n_4 = 1.79472$   $\nu_4 = 25.71$
$r_8 = -161.55$ (aspherical surface)
$d_8 =$ (variable)
$r_9 = 61.784$
$d_9 = 2.3$   $n_5 = 1.49216$   $\nu_5 = 57.50$
$r_{10} = 170.461$
f   41.5 ($f_W$)   64.3 ($f_T$)
$d_6$   17.02 ($l_{2W}$)   7.14   $f_2 = -43.55$
$d_8$   9.97   42.36   $\phi_2 = 19.4$
$P_8 = 0.96$   $E_8 = 0.465 \times 10^{-5}$   $F_8 = 0.898 \times 10^{-7}$   $G_8 = -0.314 \times 10^{-9}$
$R = 1.169$   $l_{2W}/f_W = 0.24$   $|f_2|/f_W = 1.05$
F/5.6~6.3

In respective embodiments shown in the above, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indices of respective lenses, reference symbols $\nu_1$ through $\nu_5$ respectively represent Abbe's numbers of respective lenses, reference symbols $f_W$ and $f_T$ respectively represent the focal length of the lens system as a whole in the position of the short focal length and the focal length of the lens system as a whole in the position of the long focal length, reference symbol $f_2$ represents the focal length of the second lens unit, reference symbol $l_{2W}$ represents the airspace between the second and third lens units in the position of the short focal length, reference symbols $P_8$, $P_9$, $E_8$, $E_9$, $F_8$, $F_9$, $G_8$ and $G_9$ respectively represent coefficients of aspherical surfaces adopted on the eighth and ninth surfaces counted from the object side, reference symbol $\phi_2$ represents the outer diameter of the second lens unit, and reference symbol R represents the telephoto ratio of the lens system in the position of the long focal length.

In respective embodiments shown in the above, an aspherical surface expressed by the following formula is adopted for the second lens units in order to correct aberrations favourably.

$$x = \frac{Cy^2}{1 + \sqrt{1 - PC^2y^2}} + Ey^4 + Fy^6 + Gy^8 + \ldots$$

In the formula shown in the above, reference symbol x represents a distance from the origin, which represents the intersecting point between the lens surface and optical axis, measured in the direction of the optical axis, reference symbol y represents a distance from the origin measured in the direction perpendicular to the optical axis, reference symbol C represents the curvature of the lens surface at the origin, $P=1-e^2$ (reference symbol e represents eccentricity), and reference symbols E, F and G respectively represent coefficients of aspherical surface.

As described before, the second lens unit moves largely when varying the focal length. As it is evident from FIG. 1, in the position of the short focal length, the second lens unit comes to a position distant from the stop. Therefore, the height of paraxial ray is low and the paraxial ray passes through only a narrow area near the center of the lens. On the other hand, the height of offaxial ray is high and the offaxial ray passes through only the marginal area of the lens. In the position of the long focal length, the second lens unit comes to a position near the stop and, therefore, the area where the offaxial ray passes overlaps the area where the paraxial ray passes. As described in the above, the areas where the rays pass in the position of the long focal length are considerably different from the areas where the rays pass in the position of the short focal length. Therefore, to correct the variation of aberrations to be caused by the variation of the focal length, it is the most effective when the aspherical surface is adopted for the second lens unit.

Besides, when an aspherical surface is adopted also for the third lens unit as illustrated by respective embodiments, it is possible to correct offaxial aberrations more favourably.

As described in detail so far, the present invention provides a variable focal length lens system which is arranged extremely compactly form view points of both of the overall length and outer diameter of the lens system.

I claim:

1. A variable focal length lens system comprising a first, second and third lens units wherein said first lens unit comprises three lenses and has positive refractive power, said second lens unit comprises a negative lens, and said third lens unit comprises a positive lens, said variable focal length lens system being arranged to vary the focal length of said lens system as a whole from the short focal length to the long focal length by moving said first lens unit and said second lens unit toward the object side along the optical axis, said variable focal length lens system being further arranged to fulfill the conditions (1) and (2) shown below:

$$0.2 < l_{2W}/f_W < 0.28 \quad (1)$$

$$0.9 < |f_2|/f_W < 1.2 \quad (2)$$

where, reference symbol $l_{2W}$ represents the airspace between the second and third lens units in the position of the short focal length, reference symbol $f_2$ represents the focal length of the second lens unit, and reference symbol $f_W$ represents the focal length of the lens system as a whole in the position of the short focal length.

2. A variable focal length lens system according to claim 1 which comprises a first lens unit comprising three lenses and having positive refractive power, a second lens unit comprising a negative lens, and a third lens unit comprising a positive lens and wherein said second lens unit has an aspherical surface being expressed by the formula shown below when the intersecting point between the lens surface and optical axis is taken as the origin, the optical axis is traced as the x axis, and the y axis is traced perpendicularly to the x axis:

$$x = \frac{Cy^2}{1 + \sqrt{1 - PC^2y^2}} + Ey^4 + Fy^6 + Gy^8 + \ldots$$

where, reference symbol C represents the curvature of the lens surface at the origin, $P=1-e^2$ (reference symbol e represents the eccentricity), and reference symbols E, F, G, .... respectively represent coefficients of aspherical surface of the fourth power, sixth power, eighth power and so on.

3. A variable focal length lens system according to claim 2 having the following numerical data:

| | | | |
|---|---|---|---|
| $r_1 = 18.201$ | | | |
| $d_1 = 2.18$ | $n_1 = 1.8044$ | $\nu_1 = 39.58$ | |
| $r_2 = -197.048$ | | | |
| $d_2 = 1.34$ | | | |
| $r_3 = -22.066$ | | | |
| $d_3 = 1.00$ | $n_2 = 1.74$ | $\nu_2 = 28.29$ | |
| $r_4 = 13.982$ | | | |
| $d_4 = 5.43$ | | | |
| $r_5 = 50.582$ | | | |
| $d_5 = 2.2$ | $n_3 = 1.66998$ | $\nu_3 = 39.27$ | |
| $r_6 = -14.554$ | | | |
| $d_6 =$ (variable) | | | |
| $r_7 = -27.378$ | | | |
| $d_7 = 1.00$ | $n_4 = 1.78472$ | $\nu_4 = 25.71$ | |
| $r_8 = -142.25$ (aspherical surface) | | | |
| $d_8 =$ (variable) | | | |
| $r_9 = 75.10$ (aspherical surface) | | | |
| $d_9 = 2.3$ | $n_5 = 1.49216$ | $\nu_5 = 57.5$ | |
| $r_{10} = 418.467$ | | | |
| f | 41.4 ($f_W$) | 64.3 ($f_T$) | |
| $d_6$ | 16.95 ($l_{2W}$) | 9.97 | $f_2 = -43.37$ |
| $d_8$ | 7.13 | 42.26 | $\phi_2 = 19.4$ |
| $P_8 = 0.986$ | $E_8 = 0.338 \times 10^{-5}$ | $F_8 = 0.868 \times 10^{-7}$ | $G_8 = -0.293 \times 10^{-9}$ |
| $P_9 = 0.045$ | $E_9 = 0.129 \times 10^{-4}$ | $F_9 = -0.481 \times 10^{-7}$ | $G_9 = 0.487 \times 10^{-10}$ |
| R = 1.167 | $l_{2W}/f_W = 0.24$ | $|f_2|/f_W = 1.05$ | |
| F/5.6~6.3 | | | | where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indices of respective lenses, reference symbols $\nu_1$ through $\nu_5$ respectively represent Abbe's numbers of respective lenses, reference symbols $f_W$ and $f_T$ respectively represent the focal length of the lens system as a whole in the position of the short focal length and the focal length of the lens system as a whole in the position of the long focal length, reference symbol $f_2$ represents the focal length of the second lens unit, reference symbol $l_{2W}$ represents the airspace between the second and third lens units in the position of the short focal length, reference symbols $P_8$, $P_9$, $E_8$, $E_9$, $F_8$, $F_9$, $G_8$ and $G_9$ respectively represent coefficients of aspherical surfaces adopted on the eighth and ninth surfaces counted from the object side, reference symbol $\phi$ represents the outer diameter of the second lens unit, and reference symbol R represents the telephoto ratio of the lens system in the position of the long focal length.

4. A variable focal length lens system according to claim 2 having the following numerical data:

| | | | |
|---|---|---|---|
| $r_1 = 18.357$ | | | |
| $d_1 = 2.18$ | $n_1 = 1.8044$ | $\nu_1 = 39.58$ | |
| $r_2 = -192.648$ | | | |
| $d_2 = 1.34$ | | | |
| $r_3 = -22.0$ | | | |
| $d_3 = 1.0$ | $n_2 = 1.74$ | $\nu_2 = 28.29$ | |
| $r_4 = 14.039$ | | | |
| $d_4 = 5.43$ | | | |
| $r_5 = 50.121$ | | | |
| $d_5 = 2.2$ | $n_3 = 1.66998$ | $\nu_3 = 39.27$ | |
| $r_6 = -14.582$ | | | |
| $d_6 = $ (variable) | | | |
| $r_7 = -28.13$ | | | |
| $d_7 = 1.0$ | $n_4 = 1.78472$ | $\nu_4 = 25.71$ | |
| $r_8 = -161.55$ (aspherical surface) | | | |
| $d_8 = $ (variable) | | | |
| $r_9 = 61.784$ | | | |
| $d_9 = 2.3$ | $n_5 = 1.49216$ | $\nu_5 = 57.50$ | |
| $r_{10} = 170.461$ | | | |
| f | 41.5 ($f_W$) | 64.3 ($f_T$) | |
| $d_6$ | 17.02 ($l_{2W}$) | 7.14 | $f_2 = -43.55$ |
| $d_8$ | 9.97 | 42.36 | $\phi_2 = 19.4$ |
| $P_8 = 0.96$ | $E_8 = 0.465 \times 10^{-5}$ | $F_8 = -0.898 \times 10^{-7}$ | $G = -0.314 \times 10^{-9}$ |
| $R = 1.169$ | $l_{2W}/f_W = 0.24$ | $|f_2|/f_W = 1.05$ | |

F/5.6~6.3 where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indices of respective lenses, reference symbols $\nu_1$ through $\nu_5$ respectively represent Abbe's numbers of respective lenses, reference symbols $f_W$ and $f_T$ respectively represent the focal length of the lens system as a whole in the position of the short focal length and the focal length of the lens system as a whole in the position of the long focal length, reference symbol $f_2$ represents the focal length of the second lens unit, reference symbol $l_{2W}$ represents the airspace between the second and third lens units in the position of the short focal length, reference symbols $P_8$, $E_8$, $F_8$ and $G_8$ respectively represent coefficients of aspherical surfaces adopted on the eighth surface counted from the object side, reference symbol $\phi_2$ represents the outer diameter of the second lens unit, and reference symbol R represents the telephoto ratio of the lens system in the position of the long focal length.

* * * * *